3,135,741
SULFUR-CONTAINING HETEROCYCLIC STEROIDS AND PREPARATION THEREOF

Robert L. Clarke, Bethlehem, N.Y., assignor to Sterling Drug Inc., New York, N.Y., a corporation of Delaware
No Drawing. Filed May 11, 1962, Ser. No. 194,191
30 Claims. (Cl. 260—239.5)

This invention relates to heterocyclic substituted steroids, and in particular it is concerned with steroido[3,2-e]-1',4'-thiaz-5'-en-3'ones, steroido[3,2-e]-1',4'-thiazan-3'-ones; steroido[3,2-e]-1',4'-thiox-5-en-3'-ones; and steroido[3,2-e]-1',4'-thioxan-3'-ones; and the preparation thereof.

The ring structure of the compounds of the invention is represented by the following structure:

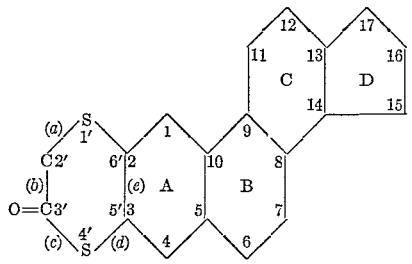

wherein X represents O, NH or N(lower-alkyl). A double bond can be present in the 2,3-position of the steroid nucleus (5',6'-position of the heterocyclic ring).

The exact nature of the steroid moiety is not critical, and it can be derived from any steroid of the general type known to exhibit hormonal or other pharmacological or endocrinological properties. Such steroid moieties have from seventeen to about twenty-three carbon atoms, not counting carbon content which may be provided by esterified hydroxy groups of the compounds provided by the present invention. It is preferred that the steroid moiety have the 5α-configuration (A/B ring juncture trans), any any unsaturation in ring A is preferably present in the 2(3)-position, common with the heterocyclic ring; in other words, the compounds are preferably saturated at the 1-, 4-, 5- and 10- positions.

The steroid moiety can be any member of the estrane, androstane or allopregnane series. The foregoing can contain varying degrees of unsaturation in rings B, C and D and a variety of substituents in the form of hydrocarbon radicals or functional groups conventionally employed in the steroid art. Representative of the steroid moieties which make up the compounds of the invention are those having at position 17 a hydroxy-acyloxy,, oxo, or both a hydroxy and a lower-alkyl radical, characteristic of the androgenic and anabolic steroids; or at position 17 a lower-alkenyl, lower-alkynyl, acetyl, hydroxyacetyl, 1,2-dihydroxyethyl, 1-hydroxyethyl, and the like radicals, characteristic of the progestational and adrenal cortical steroids. The steroid moiety can also have one or more substituents at other positions of the nucleus, for example, hydroxy, acyloxy, or oxo radicals at positions 1-, 4-, 5-, 6-, 7-, 8-, 9-, 11-, 12-, 14-, 15- or 16- (the oxo groups being restricted to positions having secondary carbons); fluorine, chlorine or bromine at the 1-, 4-, 5-, 6-, 7-, 8-, 9-, 11-, 12-, 14-, 15-, 16-, 17- or 21- positions; and one or more lower-alkyl groups, for example, at the 1-, 4-, 5-, 6-, 7-, 8-, 9-, 11-, 12-, 14-, 15- or 16-positions. The steroid moiety usually possesses angular methyl groups at $C_{10}$ and $C_{13}$, although 18- and 19-norsteroids and 18,19-bisnorsteroids, lacking one or both of the angular methyl groups at $C_{13}$ and $C_{10}$, respectively, are also representative steroids.

The 18,19-bisnorsteroid, 18- and 19-norsteroid and natural steroid moieties in the compounds of the invention contain, respectively, seventeen, eighteen and nineteen carbon atoms plus any carbon content which may be provided by one or more nuclearly substituted carbon containing radicals, up to and including a total of about twenty-three carbon atoms, exclusive of ester radicals.

When acyloxy radicals are present in the steroid moiety, the acyl radicals are preferably derived from carboxylic acids having from one to about ten carbon atoms, conventionally employed in the steroid art, and having a molecular weight less than about 200. Representative of the acyl radicals which can be present are lower-alkanoyl radicals, e.g., formyl, acetyl, propionyl, butyryl, isobutyryl, caproyl, heptanoyl, octanoyl, trimethylacetyl, and the like; carboxy-lower-alkanoyl radicals, e.g., succinyl (β-carboxypropionyl); cycloalkyl-lower-alkanoyl radicals, e.g., β-cyclopentylpropionyl, β-cyclohexylpropionyl, and the like; monocarbocyclic aroyl radicals, e.g., benzoyl, p-toluyl, p-nitrobenzoyl, 3,4,5-trimethoxybenzoyl, and the like; monocarbocyclic aryl-lower-alkanoyl or -alkenoyl radicals, such as phenylacetyl, β-phenylpropionyl, cinnamoyl, and the like; and monocarbocyclic aryloxy-lower-alkanoyl radicals, such as p-chlorophenoxyacetyl, and the like. Esters of inorganic acids, for instance, phosphoric acid, are also contemplated.

The compounds of the invention are prepared according to the following flow-sheet diagram. The compounds are represented by partial formulas depicting ring A and part of ring B of the steroid nucleus. The remainder of the steroid moiety, not being critical, is not depicted although understood to be present.

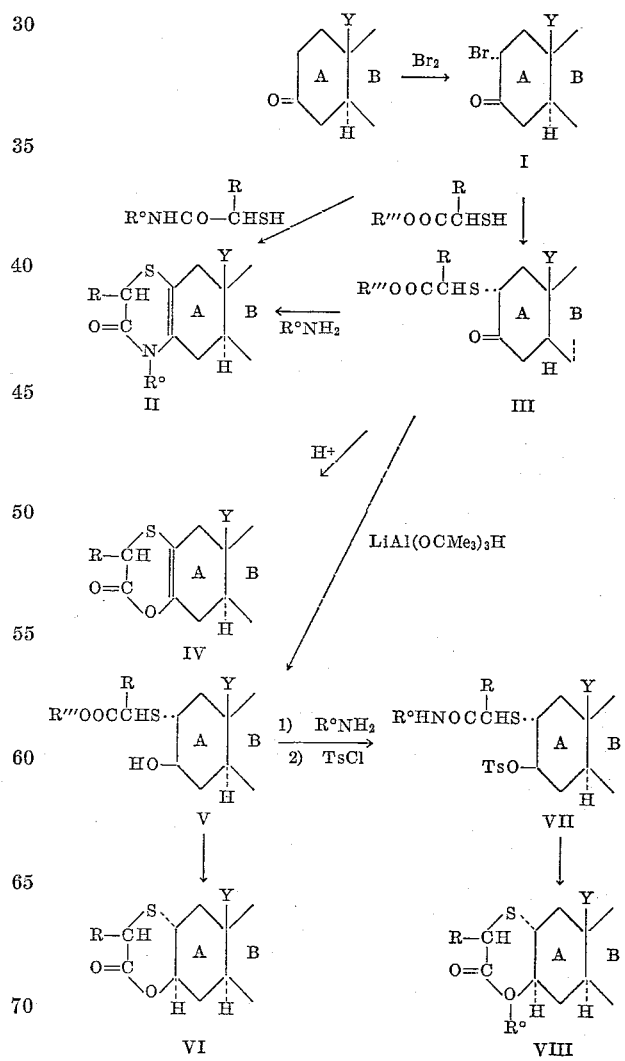

The common precursor is a 2α-halo-3-oxo-steroid, preferably a 2α-bromo-3-oxo-steroid (I) (Y being hydrogen or methyl), readily prepared by bromination of the corresponding 3-oxo-steroid according to conventional procedures, for example, by slowly adding one equivalent of bromine to an acetic acid solution of the 3-oxo-steroid. Even though oxo groups may be present in other parts of the molecule, for example in the 11-, 17- or 20-positions, a 2-halo substituent can be introduced selectively owing to the high reactivity toward replacement of the hydrogen atoms in the 2-position adjacent to the 3-oxo group.

The 2α-bromo-3-oxo-steroid (I) is condensed with an α-mercaptoalkanamide (R°NHCO—CHR—SH, wherein R° and R stand for hydrogen or lower-alkyl groups) to give a steroido[3,2-e]-1',4'-thiaz-5'-en-3'-one (II). The condensation can be carried out under a wide variety of conditions, for example, by heating the bromo steroid with at least one molar equivalent of mercaptoalkanamide in an inert solvent at a temperature between about 50° C. and 150° C. In the case where R° represents lower-alkyl it is possible to isolate some of the uncyclized intermediate 2α - (N - lower - alkylcarbamylmethylmercapto) - 3-oxo-steroid having the formula:

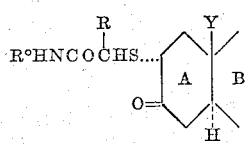

An alternate route to the compounds of the invention is by way of the intermediate 2α-carboxy- or 2α-carbo-lower-alkoxy-methylthio-3-oxo-steroids (III), prepared by condensing a 2α-bromo-3-oxo-steroid (I) with an α-mercaptoalkanoic acid, or lower-alkyl ester thereof, having the formula R'''OOC—CH(R)—SH, wherein R and R''' are hydrogen or lower-alkyl. The condensation takes place in an inert solvent in the presence of a base at a temperature between about 50° C. and 150° C. The base can be an alkali metal hydroxide or carbonate or an organic base, for example, a tertiary-amine, such as trimethylamine, collidine and the like.

A 2α-carboxy- or 2α-carbo-lower-alkoxymethylthio-3-oxo-steroid (III) can be treated with a compound of the formula R°NH₂, i.e., ammonia or a lower-alkylamine, to obtain a steroido[3,2-e]-1',4'-thiaz-5'-en-3'-one (II). The reaction takes place in an inert solvent at ordinary temperatures.

A 2α-carboxy- or 2α-carbo-lower-alkoxymethylthio-3-oxo-steroid (III) can be cyclized in the presence of a strong acid to a steroido[3,2-e]-1',4'-thiox-5'-en-3'-one (IV). The reaction takes place by heating the steroid (III) in an inert solvent with a trace of strong acid at a temperature between about 50° C. and 150° C. The strong acid can be a strong inorganic acid such as sulfuric, phosphoric or perchloric acid, or a strong organic acid such as methanesulfonic acid, benzenesulfonic acid or p-toluene-sulfonic acid.

A 2α-carboxy- or 2α-carbo-lower-alkoxymethylthio-3-oxo-steroid (III) is reduced with an alkali metal hydride reducing agent such as the lithium hydride-aluminum tertiary-butoxide complex to a 2α-carboxy- or 2α-carbo-lower-alkoxymethylthio-3β-hydroxy-steroid (V) and the latter can be cyclized in the presence of an acid or a base to a steroido[3,2-e]-1',4'-thioxan-3'-one (VI). The cyclization of V to VI takes place at ordinary temperatures, and can occur in the presence of the hydride reducing agent used in the reduction of the thiol ketone III.

In order to obtain the steroido[3,2-e]-1',4'-thiazan-3'-ones of Formula VIII, a 2α-carbo-lower-alkoxymethylthio-3β-hydroxy-steroid of Formula V is converted to the corresponding amide by ammonolysis by heating with ammonia or a lower-alkylamine (R°NH₂), and the 3-hydroxy group converted to its p-toluenesulfonate ester by heating with p-toluenesulfonyl chloride in pyridine. The resulting ester-amide VII (Ts=p-toluenesulfonyl) can then be cyclized by heating to give the desired thiazanone of Formula VIII.

The compounds of Formulas II and VIII where R° is lower-alkyl can alternatively be prepared by introducing an alkyl group into the corresponding compounds where R is hydrogen, for example by treating the latter with a lower-alkyl halide in the presence of a strong base.

The structures of the compounds of the invention were established by the mode of synthesis, their ultraviolet and infrared spectra, and by the fact that the values found upon elementary analysis corresponded with the values calculated for the assigned structures. Further proof of structure was provided by Raney nickel desulfurization of a compound of Formula II which led to a 3-acetylamino-steroid of the formula

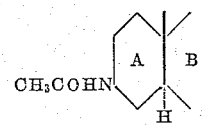

which proved to be identical with the compound produced by reduction and acetylation of the oxime of the corresponding 3-oxo-steroid. This established that the condensation of the 2α-bromo-3-oxo-steroid (I) with mercaptoacetamide had taken place in the manner depicted and not in the reverse fashion leading to a compound having sulfur attached to the 3-position and nitrogen attached to the 2-position of the steroid nucleus. Still further proof is provided by the fact that the 2α-carboxy- or 2α-carbo-lower-alkoxymethylthio-3-oxo-steroids (III) are converted to the same steroido[3,2-e]-1',4'-thiaz-5'-en-3'-ones (II) as produced in the direct conversion of I to II. In the conversion of III to II, cyclization in one direction only is possible. Stereochemical configurations were assigned by analogy and by knowledge of the configurations in the starting materials.

A preferred group of compounds, derived from readily available starting materials, comprises those having the structural formulas

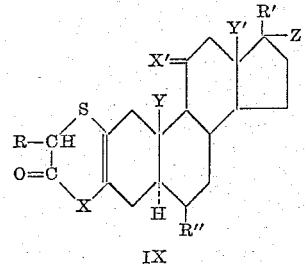

and

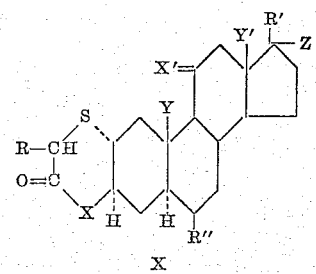

wherein R and R'' each is hydrogen or lower-alkyl; R' is hydrogen, lower-alkyl, lower-alkenyl, lower-alkynyl, acetyl, hydroxyacetyl, 1,2-dihydroxyethyl or 1-hydroxyethyl; X is O, NH or N(lower-alkyl); X' is selected from the group consisting of H₂, (H)(OH) and O; Y and Y' are hydrogen or methyl; and Z is hydrogen or hydroxy, Z being restricted to hydroxy when R' is hydrogen, lower-alkyl, lower-alkenyl or lower-alkynyl. The preferred aspect also includes compounds wherein R' and Z' together represent carbonyl oxygen, and carboxylic acid esters of compounds of structures IX and X when carbinols.

In the above general Formulas IX and X, R', when it represents a lower-alkyl, lower-alkenyl or lower-alkynyl radical, has from one to about four carbon atoms and may be straight or branched, and thus includes such groups as methyl, ethyl, propyl, isopropyl, butyl, isobutyl, tertiary-butyl, vinyl, 1-propenyl, 2-propenyl, ethynyl, propargyl, and the like.

In the above general Formulas IX and X, R and R" when they represent lower-alkyl groups, can have from one to about four carbon atoms and may be straight or branched, thus including such groups as methyl, ethyl, propyl, isopropyl, butyl, isobutyl and the like. The same applies to "lower-alkyl" when X represents N(lower-alkyl).

The compounds of Formulas IX and X are prepared from the appropriate $2\alpha$-halo-3-oxo-steriod, viz.:

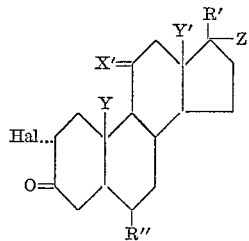

Hal representing chlorine, bromine or iodine, by the methods described hereinabove.

An especially preferred aspect of the invention relates to steroido[3,2-e]-1',4'-thiaz-5'-en-3'-ones derived from dihydrotestosterone and esters and 17-lower-alkylated derivatives thereof. These have the formula

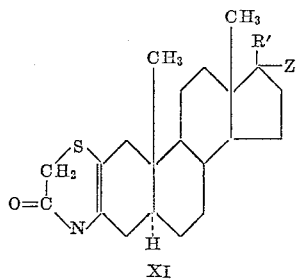

XI wherein R' is hydrogen or lower-alkyl, and Z is hydroxy or lower-alkanoyloxy.

The present invention has provided a new class of steroid compounds, and these compounds have now been made available for study as to their endocrinological activities. Compounds of the invention have been found to possess such activities as set forth below, and they are are also useful as intermediates in the preparation of different species within the scope of the invention by introduction of new groups or alteration of groups already present in the steroid nucleus by known methods. For example, a steroido[3,2-e]-1',4'-thiaz-5'-en-3'-one having a hydroxy group in the 17-position of the steroid nucleus (IX; R' is H, Z is OH) can be oxidized to the corresponding 17-oxo compound. As another instance, a steroido[3,2-e]-1',4'-thiaz-5'-en-3'-one having a 1-hydroxyethyl radical in the 17-position (IX; R' is $CH_2CH(OH)—$, Z is H) can be oxidized to the corresponding 17-acetyl compound (IX; R' is $CH_3CO—$, Z is H).

Endocrinological studies of the compounds of the invention have shown that they possess useful metabolic and hormonal properties. In particular, they have favorable balances of anabolic, androgenic, pituitary inhibiting, progestational, and adrenal cortical activities. Thus, compounds of the invention possess advantages in being anabolic (myotrophic and nitrogen retentive) at dose levels at which they do not show an appreciable degree of sex hormonal properties. Anabolic agents are useful in the alleviation of conditions arising from poor nitrogen utilization in various debilitating diseases by accelerating the growth of new healthy tissue. Generally speaking, the common anabolic agents possess a moderate to high degree of androgenic activity and their use in females leads to undesirable side-effects such as virilism and hirsutism. Therefore, the separation of these activities, as found in compounds of the present invention, which have high anabolic but low androgenic activities, is a highly desirable feature.

The compounds of the invention can be prepared for use by dispersing them in an aqueous suspension or by dissolving them in a pharmacologically acceptable oil or oil-water emulsion for parenteral administration; or by incorporation in tablet form with excipients for oral administration.

The following examples will further illustrate the invention without the latter being limited thereby.

EXAMPLE 1

$17\beta$-Acetoxyandrostano[3,2-e]-1',4'-Thiaz-5'-En-3'-One

[IX; R, R' and R" are H, X is NH, X' is $H_2$, Y and Y' are $CH_3$, Z is $OCOCH_3$]

A mixture of 7.25 g. of $17\beta$-acetoxy-$2\alpha$-bromoandrostan-3-one, 3.18 g. of mercaptoacetamide and 260 ml. of methanol was refluxed for three hours in a nitrogen atmosphere. The reaction mixture was concentrated in vacuo, and the residue was recrystallized from methanol to give $17\beta$-acetoxyandrostano[3,2-e]-1',4'-thiaz-5'-en-3'-one in the form of colorless needles, M.P. above 300° C., $[\alpha]_D^{25}=-20.0°$ (1% in chloroform); ultraviolet maxima at 230 and 299 m$\mu$ (E=4,100 and 2,600).

A revised procedure was carried out as follows: A mixture of 22.25 g. of $17\beta$-acetoxy-$2\alpha$-bromoandrostan-3-one, 7.40 g. of mercaptoacetamide, 13.1 g. of collidine and 500 ml. of acetonitrile was refluxed in a nitrogen atmosphere for one and one-half days. The reaction mixture was concentrated in vacuo at 45° C. to a small volume, and the product allowed to separate upon cooling. The product was collected by filtration, washed with water and with methanol and dried to give 18.0 g. of $17\beta$-acetoxyandrostano[3,2-e]-1',4'-thiaz-5'-en-3'one, M.P. 333–336° C. (uncorr. vac.).

When measured by its effect upon the growth of the levator ani muscle in the rat, $17\beta$-acetoxyandrostano[3,2-e]-1',4'-thiaz-5'-en-3'-one was found to possess myotrophic activity with a low degree of androgenicity when administered subcutaneously at dose levels ranging from 0.7 to 11.2 mg./kg./day.

By replacing the mercaptoacetamide in the foregoing preparation by a molar equivalent amount of $\alpha$-mercaptopropionamide, $\alpha$-mercaptobutyramide, N-methyl-$\alpha$-mercaptopropionamide or $\alpha$-mercaptocaproamide, there can be obtained, respectively, $17\beta$-acetoxyandrostano[3,2-e]-2-methyl-1',4'-thiaz-5'-en-3'-one [IX; R is $CH_3$, R' and R" are H, X is NH, X' is $H_2$, Y and Y' are $CH_3$, Z is $OCOCH_3$]; $17\beta$-acetoxyandrostano[3,2-e] - 2'-ethyl-1',4'-thiaz-5'-en-3'-one [IX; R is $C_2H_5$, R' and R" are H, X is NH, X' is $H_2$, Y and Y' are $CH_3$, Z is $OCOCH_3$]; $17\beta$-acetoxyandrostano[3,2-e]-2',4'-dimethyl - 1',4' - thiaz-5'-en-3'-one [IX; R is $CH_3$, R' and R" are H, X is N($CH_3$), X' is $H_2$, Y and Y' are $CH_3$, Z is $OCOCH_3$]; or $17\beta$-acetoxyandrostano[3,2-e]-2' - (n-butyl) - 1',4' - thiaz-5'-en-3'-one [IX; R is n-$C_4H_9$, R' and R" are H, X is NH, X' is $H_2$, Y and Y' are $CH_3$, Z is $OCOCH_3$].

EXAMPLE 2

$17\beta$-Hydroxyandrostano[3,2-e]-1',4'-Thiaz-5'-En-3'-One

[IX; R, R' and R" are H, X is NH, X' is $H_2$, Y and Y' are $CH_3$, Z is OH]

A mixture of 9.0 g. of $17\beta$-acetoxyandrostano[3,2-e]-1',4'-thiaz-5'-en-3'-one (Example 1), 9.0 g. of potassium bicarbonate, 50 ml. of water and 1500 ml. of methanol was refluxed for twenty-four hours. The reaction mixture was concentrated until the product began to crystallize. The product was collected by filtration and dried to gi 7.2 g. of 17β-hydroxyandrostano[3,2-e]-1',4'-thiaz-5'-en-3'-one, which upon crystallization from methanol was obtained as colorless needles, M.P. 251.8–256.6° C. (corr.), $[\alpha]_D^{25}=-9.0°$ (1% in chloroform).

When measured by its effect upon the growth of the levator ani muscle in the rat, 17β-hydroxyandrostano-[3,2-e]-1'4'-thiaz-5'-en-3'-one was found to possess myotrophic activity with a low degree of androgenicity when administered subcutaneously at dose levels ranging from 0.7 to 11.2 mg./kg./day.

EXAMPLE 3

*17β-(3-Cyclohexylpropionoxy)Androstano[3,2-e]-1',4'-Thiaz-5'-En-3'-One*

[IX; R, R' and R'' are H, X is NH, X' is $H_2$, Y and Y' are $CH_3$, Z is $OCOCH_2CH_2C_6H_{11}$]

A mixture of 3.7 g. of 17β-hydroxyandrostano[3,2-e]-1',4'-thiaz-5'-en-3'-one (Example 2), 6 g. of β-cyclopentylpropionic anhydride and 50 ml. of pyridine was heated for six hours on a steam bath. The reaction mixture was added to 1.5 liters of water and the product collected by filtration. The latter was dissolved in chloroform, and the chloroform solution extracted with aqueous sodium bicarbonate solution and concentrated to dryness. The residue was dissolved in 150 ml. of methylene dichloride, 300 ml. of ether and 550 ml. of n-pentane were added, and the solution was chromatographed on a column of 150 g. of silica gel. The fractions yielding colorless crystalline material were combined and recrystallized first from a methylene dichloride-ethyl acetate mixture and then from a methylene dichloride-methanol mixture to give 17β-(3-cyclohexylpropionoxy)androstano-[3,2-e]-1',4'-thiaz-5'-en-3'-one as colorless blades, M.P. 267.8–268.6° C. (corr.), $[\alpha]_D^{25}=-8.8°$ (1% in chloroform); ultraviolet maxima at 230 and 298 mμ (E=4,300 and 2,300).

Similarly, 17β-hydroxyandrostano[3,2-e]-1',4'-thiaz-5'-en-3'-one can be caused to react with propionic anhydride, caproyl chloride, β-cyclopentylpropionyl chloride, benzoyl chloride, p-nitrobenzoyl chloride, 3,4,5-trimethoxybenzoyl chloride, phenylacetyl chloride, cinnamoyl chloride, or p-chlorophenoxyacetyl chloride, to give, respectively, 17β-propionoxyandrostano[3,2-e]-1',4'-thiaz-5'-en-3'-one, 17β-caproyloxyandrostano[3,2-e]-1',4'-thiaz-5'-en-3'-one, 17β-(β-cyclopentylpropionoxy)androstano[3,2-e]-1',4'-thiaz-5'-en-3'-one, 17β-benzoyloxyandrostano[3,2-e]-1',4'-thiaz-5'-en-3'-one, 17β-(p-nitrobenzoyloxy)androstano[3,2-e]-1',4'-thiaz-5'-en-3'-one, 17β-(3,4,5-trimethoxybenzoyloxy)androstano[3,2-e]-1',4'-thiaz-5'-en-3'-one, 17β-phenylacetoxyandrostano[3,2-e]-1',4'-thiaz-5'-en-3'-one, 17β-cinnamoyloxyandrostano-[3,2-e]-1',4'-thiaz-5'-en-3'-one, or 17β-(4-chlorophenoxyacetoxy)androstano[3,2-e]-1',4'-thiaz-5'-en-3'-one.

EXAMPLE 4

*17β-(β-Carboxypropionoxy)Androstano[3,2-e]-1',4'-Thiaz-5'-En-3'-One*

[IX; R, R' and R'' are H, X is NH, X' is $H_2$, Y and Y' are $CH_3$, Z is $OCOCH_2CH_2COOH$]

A mixture of 3.00 g. of 17β-hydroxyandrostano[3,2-e]-1',4'-thiaz-5'-en-3'-one (Example 2), 15 g. of succinic anhydride (M.P. 114–119.5° C.) and 60 ml. of pyridine was heated on a steam bath for four hours. The reaction mixture was poured into 400 ml. of distilled water, and the product was filtered, dried and recrystallized from methanol. The product was further purified by dissolving it in acetone, filtering the solution through silica and infusorial earth, concentrating the solution and adding hexane to cause the product to precipitate. The resulting material was collected and recrystallized from acetone to give 17β-(β-carboxypropionoxy)androstano[3,2-e]-1',4'-thiaz-5'-en-3'-one, M.P. 266.6–267.8° C. (corr.), $[\alpha]_D^{25}=-32.8°$ (1% in pyridine).

17β-(β-carboxypropionoxy)androstano[3,2-e]-1',4'-thiaz-5'-en-3'-one showed pituitary inhibition when administered subcutaneously to mature female rats at a dose level of 10.0 mg./kg./day.

EXAMPLE 5

17-oxoandrostano[3,2-e]-1',4'-thiaz-5'-en-3'-one [IX; R and R'' are H, X is NH, X' is $H_2$, Y and Y' are $CH_3$, R' and Z together represent O] was prepared from 9.18 g. of 2α-bromoandrostane-3,17-dione, 2.62 g. of mercaptoacetamide, 6.0 g. of collidine and 250 ml. of acetonitrile according to the manipulative procedure described above in Example 1. 17-oxoandrostano[3,2-e]-1',4'-thiaz-5'-en-3'-one was obtained in the form of pale orange crystals, M.P. 387–390° C. (uncorr., dec., vac.), $[\alpha]_D^{25}=+26.0°$ (1% in pyridine).

EXAMPLE 6

*17β-Hydroxy-17α-Methylandrostano[3,2-e]-1',4'-Thiaz-5'-En-3'-One*

[IX; R is H, R' is $CH_3$, R'' is H, X is NH, X' is $H_2$, Y and Y' are $CH_3$, Z is OH]

A mixture of 7.85 g. of 2α-bromo-17α-methylandrostan-17β-ol-3-one, mercaptoacetamide (from 4.8 g. of methyl thioglycolate in 35 ml. of ethanol containing 15% of ammonia) and 300 ml. of methanol was refluxed for three hours. The product was isolated and recrystallized from methanol to give 17β-hydroxy-17α-methylandrostano[3,2-e]-1',4'-thiaz-5'-en-3'-one, M.P. 302.5–306.8° C. (corr.), $[\alpha]_D^{25}=-25.5°$ (1% in chloroform); ultraviolet maxima at 232 and 298 mμ (E=3,802 and 2,416).

When measured by its effect upon the growth of the levator ani muscle in the rat, 17β-hydroxy-17α-methylandrostano[3,2-e]-1',4'-thiaz-5'-en-3'-one was found to possess myotrophic activity with a low degree of androgenicity when administered subcutaneously at dose levels ranging from 0.7 to 11.2 mg./kg./day.

EXAMPLE 7

*20-Oxoallopregnano[3,2-e]-1',4'-Thiaz-5'-En-3'-One*

[IX; R is H, R' is $COCH_3$, R'' is H, X is NH, X' is $H_2$, Y and Y' are $CH_3$, Z is H]

A mixture of 3.95 g. of 2α-bromoallopregnane-3,20-dione, 1.82 g. of mercaptoacetamide and 140 ml. of methanol was refluxed for one day. The product was isolated and recrystallized from a methylene dichloride-acetone mixture to give 20-oxoallopregnano[3,2-e]-1',4'-thiaz-5'-en-3'-one as colorless needles, M.P. 285.4–289.2° C. (corr., dec.), $[\alpha]_D^{25}=+58.6°$ (1% in chloroform); ultraviolet maxima at 230 and 299 mμ (E=3,900 and 2,400).

EXAMPLE 8

*17β-Acetoxyandrostano[3,2-e]-N-Ethyl-1',4'-Thiaz-5'-En-3'-One*

[IX; R, R' and R'' are H, X is $N(C_2H_5)$, X' is $H_2$, Y and Y' are $CH_3$, Z is $OCOCH_3$]

A mixture of 1.00 g. of 17β-acetoxyandrostano[3,2-e]-1',4'-thiaz-5'-en-3'-one (Example 1), 0.50 g. of sodium hydride and 100 ml. of toluene was refluxed for four and one-half hours. Ethyl iodide (10 ml.) was then added and the mixture was refluxed for four hours longer. Water was added dropwise to destroy the excess sodium hydride, the layers were separated and ether was added to the toluene solution. The organic layer was washed with saturated sodium chloride solution, dried over anhydrous sodium sulfate and concentrated in vacuo. The residue was dissolved in 50 ml. of ether, filtered and the solution concentrated. The residue was dissolved in a solvent mixture containing 20 parts of ether and 80 parts of pentane and chromatographed on a column of 30 g. of silica gel. The column was eluted with a solvent mixture containing 30 parts of ether and 70 parts of pentane and the product thus obtained was recrystallized several times from acetonitrile to give 17β-acetoxyandrostano[3,2-e]-N-ethyl-1',4'-thiaz-5'-en-3'-one, M.P. 204.5-210° C. (uncorr., vac.); ultraviolet maxima at 228 and 282 mμ (E=4,800 and 2,400), infrared maxima at 5.74 and 6.01 μ.

17β - acetoxyandrostano[3,2 - e] -N - ethyl - 1',4' - thiaz-5'-en-3'-one can also be prepared by replacing the mercaptoacetamide in Example 1 by a molar equivalent amount of N-ethylmercaptoacetamide.

EXAMPLE 9

(a) 2α - bromo - 6α - methyl - 17β - acetoxyandrostan-3-one can be prepared by treating an acetic acid solution of 6α-methyl-17β-acetoxyandrostan-3-one with a molar equivalent amount of bromine.

(b) 6α - methyl - 17β - acetoxyandrostano[3,2 - e] - 1',4'-thiaz-5'-en-3'-one [IX; R and R' are H, R'' is CH$_3$, X is NH, X' is H$_2$, Y and Y' are CH$_3$, Z is OCOCH$_3$] can be prepared from 2α - bromo-6α-methyl-17β-acetoxyandrostan-3-one and mercaptoacetamide according to the manipulative procedure described above in Example 1.

EXAMPLE 10

(a) *2α-Bromo-17β-Acetoxyandrostane-3,11-Dione*

Bromine (4.35 g.) and 2.02 g. of fused sodium acetate in 170 ml. of acetic acid was added dropwise to a solution of 9.40 g. of 17β-acetoxyandrostane-3,11-dione in 85 ml. of acetic acid containing a trace of hydrogen bromide. The reaction mixture was then added to 350 ml. of water and extracted with ether. The ether extracts were washed with water and saturated sodium chloride solution, dried, and concentrated. The residue was recrystallized from acetone-hexane containing a trace of pyridine to give 2α-bromo-17β-acetoxyandrostane-3,11-dione, M.P. 178.0–178.8° C. (corr.), [α]$_D^{25}$=+47.3° (1% in acetone).

(b) *17β-Acetoxy-11-Oxoandrostano[3,2-e]-1',4'-Thiaz-5'-En-3'-One*

[IX; R, R' and R'' are H, X is NH, X' is O, Y and Y' are CH$_3$, Z is OCOCH$_3$]

2α-bromo-17β-acetoxyandrostane-3,11-dione (2.20 g.), 0.72 g. of mercaptoacetamide, 1.8 ml. of collidine and 100 ml. of acetonitrile was refluxed under nitrogen for twenty-four hours. The resulting product was isolated and recrystallized from acetonitrile to give 17β-acetoxy-11 - oxoandrostano[3,2 - e] - 1',4' - thiaz - 5' - en - 3'-one, M.P. 330–331° C. (dec.)(uncorr.), [α]$_D^{25}$=+5.3° (1% in chloroform).

EXAMPLE 11

17α - ethynyl - 17β - hydroxyandrostano[3,2-e] - 1',4'-thiaz-5'-en-3'-one [IX; R is H, R' is C≡CH, R'' is H, X is NH, X' is H$_2$, Y and Y' are CH$_3$, Z is OH] can be prepared by treating 17-oxoandrostano[3,2-e]-1',4'-thiaz-5'-en-3'-one (Example 5) with potassium acetylide in tertiary-butyl alcohol solution.

The compounds of the following examples can be prepared by condensing the appropriate 2α-bromo-3-oxo-steroid with mercaptoacetamide according to the manipulative procedures described above in Example 1. The intermediate 2α-bromo-3-oxo compound is in turn prepared by adding dropwise to an acetic acid solution of the 3-oxo-steroid an acetic acid solution of one equivalent of bromine relative to the steroid.

EXAMPLE 12

17β - hydroxy - 17α - methyl - 19 - norandrostano[3,2-e]-1',4'-thiaz-5'-en-3'-one [IX; R is H, R' is CH$_3$, R'' is H, X is NH, X' is H$_2$, Y is H, Y' is CH$_3$, Z is OH] from 2α - bromo - 17α - methyl - 19 - norandrostan - 17β - ol-3-one and mercaptoacetamide.

EXAMPLE 13

17β - hydroxy - 17α - ethylandrostano[3,2 - e] - 1',4'-thiaz-5'-en-3'-one [IX; R is H, R' is C$_2$H$_5$, R'' is H, X is NH, X' is H$_2$, Y and Y' are CH$_3$, Z is OH] from 2α-bromo-17α-ethylandrostan-17β-ol-3-one and mercaptoacetamide.

EXAMPLE 14

4,4,17α - trimethyl - 17β - hydroxyandrostano[3,2-e]-1',4'-thiaz-5'-en-3'-one from 2α-bromo-4,4,17α-trimethylandrostan-17β-ol-3-one and mercaptoacetamide.

EXAMPLE 15

17β - hydroxy - 17α - propargylandrostano[3,2 - e] - 1',4'-thiaz-5'-en-3'-one [IX; R is H, R' is CH$_2$C≡CH, R'' is H, X is NH, X' is H$_2$, Y and Y' are CH$_3$, Z is OH] from 2α-bromo-17α-propargylandrostan-17β-ol-3-one and mercaptoacetamide.

EXAMPLE 16

6β,17β - dihydroxyandrostano[3,2 - e] - 1',4' - thiaz - 5'-en-3'-one from 2α-bromoandrostane-6β,17β-diol-3-one and mercaptoacetamide.

EXAMPLE 17

6β,17α,21 - trihydroxy - 20 - oxoallopregnano[3,2 - e]-1',4'-thiaz-5'-en-3'-one from 2α-bromoallopregnane-6β,17α,21-triol-3,20-dione and mercaptoacetamide.

EXAMPLE 18

17α,21 - dihydroxy - 12,20 - dioxoallopregnano[3,2 - e]-1',4'-thiaz-5'-en-3'-one from 2α-bromoallopregnane-17α,21-diol-3,12,20-trione and mercaptoacetamide.

EXAMPLE 19

7,20 - dioxoallopregnano[3,2 - e] - 1',4' - thiaz - 5' - en-3'-one from 2α-bromoallopregnane-3,7,20-trione and mercaptoacetamide.

EXAMPLE 20

6α,17α - dimethyl - 17β - hydroxyandrostano[3,2 - e]-1',4'-thiaz-5'-en-3'-one [IX; R is H, R' and R'' are CH$_3$, X is NH, X' is H$_2$, Y and Y' are CH$_3$, Z is OH] from 2α-bromo-6α,17α-dimethylandrostan-17β-ol-3-one and mercaptoacetamide.

EXAMPLE 21

17β - hydroxy - 17α - propylandrostano[3,2 - e] - 1',4'-thiaz-5'-en-3'-one [IX; R is H, R' is CH$_2$CH$_2$CH$_3$, R'' is H, X is NH, X' is H$_2$, Y and Y' are CH$_3$, Z is OH] from 2α-bromo-17α-propylandrostan-17β-ol-3-one and mercaptoacetamide.

EXAMPLE 22

17β - hydroxy - 17α - propynylandrostano[3,2 - e] - 1',4'-thiaz-5'-en-3'-one [IX; R is H, R' is C≡CCH$_3$, R'' is H, X is NH, X' is H$_2$, Y and Y' are CH$_3$, Z is OH] from 2α-bromo-17α-propynylandrostan-17β-ol-3-one and mercaptoacetamide.

EXAMPLE 23

9α,17β - dihydroxyandrostano[3,2 - e] - 1',4' - thiaz-5'-en-3'-one from 2α-bromo-9α,17β-dihydroxyandrostan-3-one and mercaptoacetamide.

EXAMPLE 24

17α,20 - dihydroxy - 12 - oxoallopregnano[3,2 - e] - 1',4'-thiaz-5'-en-3'-one from 2α-bromoallopregnane-17α,20-diol-3,12-dione and mercaptoacetamide.

EXAMPLE 25

20β - hydroxy - 16 - oxoallopregnano[3,2 - e] - 1',4'-thiaz-5'-en-3'-one from 2α-bromoallopregnan-20β-ol-3,16-dione and mercaptoacetamide.

EXAMPLE 26

20 - oxoallopregnano[3,2 - e] - 2' -methyl - 1',4' - thiaz-5'-en-3'-one [IX; R is CH$_3$, R' is COCH$_3$, R'' is H, X is NH, X' is H$_2$, Y and Y' are CH$_3$, Z is H] from 2α-bromoallopregnane-3,20-dione and α-mercaptopropionamide.

EXAMPLE 27

17α,21 - dihydroxy - 20 - oxoallopregnano[3,2-e]-1',4'- thiaz-5'-en-3'-one [IX; R is H, R' is COCH$_2$OH, R" is H, X is NH, X' is H$_2$, Y and Y' are CH$_3$, Z is OH] from 2α-bromoallopregnane-17α,21-diol-3,20-dione and mercaptoacetamide.

EXAMPLE 28

11α,17α - dihydroxy - 20-oxoallopregnano[3,2-e]-1',4'-thiaz-5'-en-3'-one [IX; R is H, R' is COCH$_3$, R" is H, X is NH, X' is (H)(OH), Y and Y' are CH$_3$, Z is OH] from 2α-bromoallopregnane-11α,17α-diol-3,20-dione and mercaptoacetamide.

EXAMPLE 29

11α,21 - dihydroxy - 20 - oxoallopregnano[3,2-e]-1',4'-thiaz-5'-en-3'-one [IX; R is H, R' is COCH$_2$OH, R" is H, X is NH, X' is (H)(OH), Y and Y' are CH$_3$, Z is H] from 2α-bromoallopregnane-11α,21-diol-3,20-dione and mercaptoacetamide.

EXAMPLE 30

16α,17α - epoxy - 11α - hydroxy - 20 - oxoallopregnano[3,2-e]-1',4'-thiaz-5'-en-3'-one from 2α-bromo-16α,17α-epoxyallopregnan-17-ol-3,20-dione and mercaptoacetamide.

EXAMPLE 31

9α-fluoro - 11β,17α,21-trihydroxy-20-oxoallopregnano[3,2-e]-1',4'-thiaz-5'-en-3'-one from 2α-bromo-9α-fluoroallopregnane-11β,17α,21-triol-3,20-dione and mercaptoacetamide.

EXAMPLE 32

11α - hydroxy - 20-oxoallopregnano[3,2-e]-1',4'-thiaz-5'-en-3'-one [IX; R is H, R' is COCH$_3$, R" is H, X is NH, X' is (H)(OH-α), Y and Y' are CH$_3$, Z is H] from 2α-bromoallopregnan-11α-ol-3,20-dione and mercaptoacetamide.

EXAMPLE 33

11β - hydroxy - 20-oxoallopregnano[3,2-e]-1',4'-thiaz-5'-en-3'-one [IX; R is H, R' is COCH$_3$, R" is H, X is NH, X' is (H)(OH-β), Y and Y' are CH$_3$, Z is H] from 2α-bromoallopregnan-11β-ol-3,20-dione and mercaptoacetamide.

EXAMPLE 34

15β - hydroxy - 20-oxoallopregnano[3,2-e]-1',4'-thiaz-5'-en-3'-one from 2α-bromoallopregnan-15β-ol-3,20-dione and mercaptoacetamide.

EXAMPLE 35

17α - hydroxy - 20-oxoallopregnano[3,2-e]-1',4'-thiaz-5'-en-3'-one [IX; R is H, R' is COCH$_3$, R" is H, X is NH, X' is H$_2$, Y and Y' are CH$_3$, Z is OH] from 2α-bromoallopregnan-17α-ol-3,20-dione and mercaptoacetamide.

EXAMPLE 36

21 - hydroxy - 20 - oxoallopregnano[3,2-e]-1',4'-thiaz-5'-en-3'-one [IX; R is H, R' is COCH$_2$OH, R" is H, X is NH, X' is H$_2$, Y and Y' are CH$_3$, Z is H] from 2α-bromoallopregnan-21-ol-3,20-dione and mercaptoacetamide.

EXAMPLE 37

11α,17α,21 - trihydroxy - 20 - oxoallopregnano[3,2-e]-1',4'-thiaz-5'-en-3'-one [IX; R is H, R' is COCH$_2$OH, R" is H, X is NH, X' is (H)(OH), Y and Y' are CH$_3$, Z is OH] from 2α-bromoallopregnane-11α,17α,21-triol-3,20-dione and mercaptoacetamide.

EXAMPLE 38

17α,21 - dihydroxy - 11,20 - dioxoallopregnano[3,2-e]-1',4'-thiaz-5'-en-3'-one [IX; R is H, R' is COCH$_2$OH, R" is H, X is NH, X' is O, Y and Y' are CH$_3$, Z is OH] from 2α-bromoallopregnane - 17α,21-diol-3,11,20-trione and mercaptoacetamide.

EXAMPLE 39

16α,17α - epoxy - 12,20-dioxoallopregnano[3,2-e]-1',4'-thiaz-5'-en-3'-one from 2α-bromo-16α,17α-epoxyallopregnane-3,12,20-trione and mercaptoacetamide.

EXAMPLE 40

15,20 - dioxoallopregnano[3,2-e] - 1',4'-thiaz-5'-en-3'-one from 2α-bromoallopregnane-3,15,20-trione and mercaptoacetamide.

EXAMPLE 41

16β,20α - dihydroxyallopregnano[3,2-e] - 1',4'-thiaz-5'-en-3'-one from 2α-bromoallopregnane-16β,20α-diol-3-one and mercaptoacetamide.

EXAMPLE 42

20 - oxoallopregn - 14 - eno[3,2-e]-1',4'-thiaz-5'-en-3'-one from 2α-bromoallopregn-14-ene-3,20-dione and mercaptoacetamide.

EXAMPLE 43

20 - oxoallopregn - 16 - eno[3,2-e]-1',4'-thiaz-5'-en-3'-one from 2α-bromoallopregn-16-ene-3,20-dione and mercaptoacetamide.

EXAMPLE 44

Allopregn - 17(20) - eno[3,2-e]-1',4'-thiaz-5'-en-3'-one from 2α-bromoallopregn-17(20)-en-3-one and mercaptoacetamide.

Similarly, 17β-hydroxy-6-androsteno[3,2-e]-1',4'-thiaz-5'-en-3'-one and 17β-hydroxy-9(11)-androsteno[3,2-e]-1',4'-thiaz-5'-en-3'-one can be prepared by reacting mercaptoacetamide with 2α-bromo-6-androsten-17β-ol-3-one and 2α - bromo - 9(11)-androsten-17β-ol-3-one, respectively.

EXAMPLE 45

(a) *2α-Carbomethoxymethylmercapto-17β-Acetoxyandrostan-3-One*

A mixture of 15.00 g. of 2α-bromo-17β-acetoxyandrostan-3-one, 5.85 g. of methyl thioglycolate, 7.5 ml. of collidine and 500 ml. of acetonitrile was refluxed under nitrogen for about eighteen hours. Most of the acetonitrile was removed by distillation and 500 ml. of ether and 300 ml. of water were added to the residue. The mixture was shaken, and the ether layer was separated and washed successively with water, 2N hydrochloric acid, water, saturated sodium bicarbonate solution, water and saturated sodium chloride solution. The ether solution was dried and concentrated to dryness, and the residue was recrystallized first from acetone and then from an acetone-hexane mixture to give 2α-carbomethoxymethylmercapto - 17β - acetoxyandrostan - 3 - one, M.P. 143.2–145.6° C. (corr.), [α]$_D^{25}$=+22.2° (1% in chloroform).

By replacing the methyl thioglycolate in the foregoing preparation by a molar equivalent amount of thioglycolic acid, ethyl thioglycolate, methyl α-mercaptopropionate or methyl α-mercaptocaproate there can be obtained, respectively, 2α-carboxymethylmercapto-17β-acetoxyandrostan-3-one, 2α-carbethoxymethylmercapto-17β-acetoxyandrostan-3 - one, 2α-(1-carbomethoxyethylmercapto)-17β-acetoxyandrostan-3-one or 2α-(1-carbomethoxypentylmercapto)-17β-acetoxyandrostan-3-one.

(b) *2-Carbomethoxymethylmercapto-3,17β-Diacetoxy-2-Androstene*

A mixture of 3.00 g. of 2-carbomethoxymethylmercapto-17β-acetoxyandrostan-3-one, 30 ml. of acetic anhydride and 3 ml. of acetyl chloride was refluxed for three hours and then poured into 600 ml. of water. The mixture was extracted with ether and the ether solution washed with saturated sodium bicarbonate solution, water and sodium chloride solution, and dried and concentrated. The residue was recrystallized three times from an ether-pentane mixture to give 2-carbomethoxymethylmercapto - 3,17β - diacetoxy - 2 - androstene, M.P. 111.6–113.6° C. (corr.), [α]$_D^{25}$=+31.7° (1% in acetone).

The compounds of the following examples can be prepared by condensing the appropriate 2α-bromo-3-oxo-

EXAMPLE 46

2α - carbomethoxymethylmercaptoandrostane - 3,17 - dione from 2α-bromoandrostane-3,17-dione and methyl thioglycolate.

EXAMPLE 47

2α - carbomethoxymethylmercapto - 17α-methylandrostan-17β-ol-3-one from 2α-bromo-17α-methylandrostan-17β-ol-3-one and methyl thioglycolate.

EXAMPLE 48

2α - carbomethoxymethylmercaptoallopregnane - 3,20-dione from 2α-bromoallopregnane-3,20-dione and methyl thioglycolate.

EXAMPLE 49

2α - carbomethoxymethylmercapto - 17α - methyl - 19-norandrostan-17β-ol-3-one from 2α-bromo-17α-methyl-19-norandrostan-17β-ol-3-one and methyl thioglycolate.

EXAMPLE 50

2α - carbomethoxymethylmercapto - 4,4,17α-trimethylandrostan-17β-ol-3-one from 2α-bromo-4,4,17α-trimethylandrostan-17β-ol-3-one and methyl thioglycolate.

EXAMPLE 51

2α - carbomethoxymethylmercapto - 17α - propargylandrostan-17β-ol-3-one from 2α-bromo-17α-propargylandrostan-17β-ol-3-one and methyl thioglycolate.

EXAMPLE 52

2α - carbomethoxymethylmercapto - 6α,17α - dimethylandrostan-17β-ol-3-one from 2α-bromo-6α,17α-dimethylandrostan-17β-ol-3-one and methyl thioglycolate.

EXAMPLE 53

2α - carbomethoxymethylmercaptoallopregnane - 11α, 17α-diol-3,20-dione from 2α-bromoallopregnane-11α,17α-diol-3,20-dione and methyl thioglycolate.

EXAMPLE 54

2α - carbomethoxymethylmercaptoallopregnane - 11α, 21-diol-3,20-dione from 2α-bromoallopregnane-11α,21-diol-3,20-dione and methyl thioglycolate.

EXAMPLE 55

2α - carbomethoxymethylmercaptoallopregnane - 17α, 21-diol-3,11,20-trione from 2α-bromoallopregnane-17α,21-diol-3,11,20-trione and methyl thioglycolate.

EXAMPLE 56

*2α-Carboxymethylmercapto-17β-Hydroxyandrostan-3-One*

To a solution of 4.55 g. of 2α-carbomethoxymethylmercapto-17β-acetoxyandrostan-3-one in 450 ml. of methanol was added a solution of 4.55 g. of potassium bicarbonate in 22.5 ml. of water, and the mixture was refluxed for twenty hours. The reaction mixture was concentrated in vacuo and 450 ml. of water and 450 ml. of ether were added. The mixture was shaken, the water layer separated and acidified with 2N hydrochloric acid. The product which separated was collected by filtration, dried, dissolved in methanol, 2.0 g. of potassium hydroxide was added, and the mixture refluxed for one hour. The latter mixture was concentrated in vacuo, shaken with ether and water, and the water layer acidified with 2N hydrochloric acid. The solid product was collected by filtration and recrystallized first from an acetone-ethyl acetone-hexane mixture, then from an acetone-ethyl acetate mixture and finally from aqueous methanol to give 2α-carboxymethylmercapto-17β-hydroxyandrostan-3-one, M.P. 213.2–215.0° C. (corr.), $[\alpha]_D^{25} = -2.4°$ (1% in acetone).

EXAMPLE 57

*17β-Acetoxyandrostano[3,2-e]-1',4'-Thiaz-5'-En-3'-One*

[IX; R, R' and R" are H, X is NH, X' is H₂, Y and Y' are CH₃, Z is OCOCH₃]

Anhydrous ammonia was bubbled for ten minutes through a hot solution of 0.50 g. of 2α-carbomethoxymethylmercapto-17β-acetoxyandrostan - 3 - one (Example 45) in 15 ml. of methanol. After allowing the reaction mixture to stand for one hour at room temperature, the solid product was collected by filtration and dried to give 0.14 g. of 17β-acetoxyandrostano[3,2-e]-1',4'-thiaz-5'-en-3'-one, M.P. 318–325° C. (dec.). A mixed melting point with a sample of the same compound having the M.P. 322–328° C., prepared as described above in Example 1, showed no depression.

EXAMPLE 58

*17β-Acetoxyandrostano[3,2-e]-N-Methyl-1',4'-Thiaz-5'-En-3'-One*

[IX; R, R' and R" are H, X is NCH₃, X' is H₂ Y and Y' are CH₃, Z is OCOCH₃] was prepared by substituting methylamine for the ammonia in the procedure of Example 57. The product was obtained in the form of an oil, ultraviolet maxima at 228 and 291 mμ (E=3,570 and 1,770); infrared absorption at 3.04, 3.46, 5.78–5.90, 6.04, 6.50 and 6.92 μ.

EXAMPLE 59

*17β-Acetoxyandrostano[3,2-e]-1',4'-Thiox-5'-En-3'-One*

[IX; R, R' and R" are H, X is O, X' is H₂, Y and Y' are CH₃, Z is OCOCH₃]

A mixture of 5.3 g. of 2α-carbomethoxymethylmercapto-17β-acetoxyandrostan-3-one (Example 45), a few mg. of p-toluene-sulfonic acid monohydrate and 500 ml. of benzene was refluxed for twenty-four hours. The reaction mixture was cooled, washed three times with water, with sodium chloride solution, and dried and concentrated. The product was recrystallized twice from acetone and then from an acetone-hexane mixture to give *17β-acetoxyandrostanol[3,2-e]-1',4'-thiox-5'-en - 3'-one*, M.P. 209.0–210.0° C. (corr.), $[\alpha]_D^{25} = +6.0°$ (1% in chloroform).

17β-acetoxyandrostano[3,2-e] - 1',4'-thiox-5'-en-3'-one can also be prepared by heating 2α-carboxymethylmercapto-17β-acetoxyandrostan-3-one in benzene solution in the presence of p-toluenesulfonic acid.

By replacing the 2α-carbomethoxymethylmercapto-17β-acetoxyandrostan-3-one in the foregoing preparation by a molar equivalent amount of 2α-(1-carbomethoxyethylmercapto)-17β-acetoxyandrostan-3-one or 2α-(1-carbomethoxypentylmercapto)-17β-acetoxyandrostan - 3 - one there can be obtained, respectively, 17β-acetoxyandrostano[3,2-e]-2'-methyl-1',4'-thiox-5'-en-3'-one [IX; R is CH₃, R' and R" are H, X is O, X' is H₂, Y and Y' are CH₃, Z is OCOCH₃] or 17β-acetoxyandrostano[3,2-e]-2'-butyl-1',4'-thiox-5'-en-3'-one [IX; R is n-C₄H₉, R' and R" are H, X is O, X' is H₂, Y and Y' are CH₃, Z is OCOCH₃].

The compounds of the following examples can be prepared by heating the appropriate 2-carbomethoxymethylmercapto steroid in benzene solution in the presence of p-toluenesulfonic acid according to the manipulative procedure described above in Example 59.

EXAMPLE 60

17-oxoandrostano[3,2-e]-1',4'-thiox-5'-en-3'-one [IX; R and R" are H, X is O, X' is H₂, Y and Y' are CH₃, R' and Z together represent O] from 2α-carbomethoxymethylmercaptoandrostane-3,17-dione (Example 46).

EXAMPLE 61

17β-hydroxy-17α-methylandrostano[3,2-e]-1',4' - thiox-

5′-en-3′-one [IX; R is H, R′ is CH$_3$, R″ is H, X is O, X′ is H$_2$, Y and Y′ are CH$_3$, Z is OH] from 2α-carbomethoxymethylmercapto-17α-methylandrostan-17β-ol - 3 - one (Example 47).

EXAMPLE 62

20-oxoallopregnano[3,2-e]-1′,4′-thiox-5′-en-3′-one [IX; R is H, R′ is COCH$_3$, R″ is H, X is O, X′ is H$_2$, Y and Y′ are CH$_3$, Z is H] from 2α-carbomethoxymethylmercaptoallopregnane-3,20-dione (Example 48).

EXAMPLE 63

17β-hydroxy-17α-methyl - 19 - norandrostano[3,2-e]-1′-4′-thiox-5′-en-3′-one [IX; R is H, R′ is CH$_3$, R″ is H, X is O, X′ is H$_2$, Y is H, Y′ is CH$_3$, Z is OH] from 2α-carbomethoxymethylmercapto-17α-methyl-19 - norandrostan-17β-ol-3-one (Example 49).

EXAMPLE 64

4,4,17α-trimethyl - 17β - hydroxyandrostano[3,2-e]-1′,4′-thiox-5′-en-3′-one from 2α-carbomethoxymethylmercapto-4,4,17α-trimethylandrostan-17β-ol-3-one (Example 50).

EXAMPLE 65

17β-hydroxy - 17α - propargylandrostano[3,2-e]-1′,4′-thiox-5′-en-3′-one [IX; R is H, R′ is CH$_2$C≡CH, R″ is H, X is O, X′ is H$_2$, Y and Y′ are CH$_3$, Z is OH] from 2α-carbomethoxymethylmercapto - 17α - propargylandrostan-17β-ol-3-one (Example 51).

EXAMPLE 66

6α,17α-dimethyl-17β-hydroxyandrostano[3,2-e] - 1′,4′-thiox-5′-en-3′-one [IX; R is H, R′ and R″ are CH$_3$, X is O, X′ is H$_2$, Y and Y′ are CH$_3$, Z is OH] from 2α-carbomethoxymethylmercapto-6α,17α-dimethylandrostan - 17β-ol-3-one (Example 52).

EXAMPLE 67

11α 17α-dihydroxy-20-oxoallopregnano[3,2-e] - 1′,4′-thiox-5′-en-3′-one [IX; R is H, R′ is COCH$_3$, R″ is H, X is O, X′ is (H)(OH-α), Y and Y′ are CH$_3$, Z is OH] from 2α-carbomethoxymethylmercaptoallopregnane - 11α,17α-diol-3,20-dione (Example 53).

EXAMPLE 68

11α,21-dihydroxy - 20 - oxoallopregnano[3,2-e]-1′,4′-thiox-5′-en-3′-one [IX; R is H, R′ is COCH$_2$OH, R″ is H, X is O, X′ is (H)(OH-α), Y and Y′ are CH$_3$, Z is H] from 2α-carbomethoxymethylmercaptoallopregnane-11α,21-diol-3,20-dione (Example 54).

EXAMPLE 69

17α,21-dihydroxy - 11,20 - dioxoallopregnano[3,2-e]-1,4′-thiox-5′-en-3′one [IX; R is H, R′ is COCH$_2$OH, R″ is H, X and X′ are O, Y and Y′ are CH$_3$, Z is OH] from 2α-carbomethoxymethylmercaptoallopregnane-17α,21 - diol-3,11,20-trione (Example 55).

EXAMPLE 70

(a) *17β-Acetoxyandrostano[3,2-e]-1′,4′-Thioxan-3′-One*

[X; R, R′ and R″ are H, X is O, X′ is H$_2$, Y and Y′ are CH$_3$, Z is OCOCH$_3$]

To a solution of 25.2 g. of lithium hydride-aluminum tertiary-butoxide complex in 225 ml. of tetrahydrofuran at 5° C. was added a solution of 25.2 g. of 2α-carbomethoxymethylmercapto-17β-acetoxyandrostan-3-one (Example 45) in 130 ml. of tetrahydrofuran. The addition was performed dropwise over a period of fifty-five minutes, and the reaction mixture was then stirred for thirty minutes at 0° C. Acetic acid (7.2 ml.) was then added, the mixture was concentrated on a steam bath, and 650 ml. of methylene dichloride and 250 ml. of 1N hydrochloric acid were added. The mixture was filtered, 325 ml. of water added, and the organic layer was separated, washed with water, sodium chloride solution, dried and concentrated. The residue was recrystallized from an acetone-methylene dichloride mixture to give 10.45 g. of 17β - acetoxyandrostano[3,2 - e] - 1′,4′ - thioxan - 3′ - one, M.P. 279.8–281.4° C. (corr.), [α]$_D^{25}$=+146.1° (1% in chloroform).

(b) *2α-Carbomethoxymethylmercapto-17β-Acetoxy-androstan-3β-Ol*

The mother liquors from the recrystallization of the product obtained in part (a) above were chromatographed on a column of 350 g. of silica gel. The column was eluted with solvent containing 15% methylene dichloride, 15% ether and 70% pentane until no further material was eluted, and then with a solvent containing 15% methylene dichloride and 85% ether. The product brought out by the latter solvent was recrystallized from methanol to give 2.75 g. of 2α-carbomethoxymethylmercapto-17β-acetoxyandrostan-3β-ol, M.P. 114.6–123.0° C. (corr.), [α]$_D^{25}$=—21.6° (1% in chloroform).

By replacing the 2α-carbomethoxymethylmercapto-17β-acetoxyandrostan-3-one in the foregoing preparation by a molar equivalent amount of 2α-(1-carbomethoxyethylmercapto)-17β-acetoxyandrostan-3-one or 2α-(1-carbomethoxypentylmercapto) - 17β - acetoxyandrostan - 3-one there can be obtained, respectively, 17β-acetoxyandrostano[3,2 - e] - 2′ - methyl - 1′,4′ - thioxan - 3′ - one [X; R is CH$_3$, R′ and R″ are H, X is O, X′ is H$_2$, Y and Y′ are CH$_3$, Z is OCOCH$_3$] and 2α - (1 - carbomethoxyethylmercapto)-17β-acetoxyandrostan-3β-ol; or 17β-acetoxyandrostan[3,2-e]-2′-butyl-1′,4′-thioxan-3′-one [X; R is n-C$_4$H$_9$, R′ and R″ are H, X is O, X′ is H$_2$, Y and Y′ are CH$_3$, Z is OCOCH$_3$] and 2α-(1-carbomethoxypentylmercapto)-17β-acetoxyandrostan-3β-ol.

The compounds of the following examples can be prepared by reducing the appropriate 2-carbomethoxymethylmercapto steroid with lithium hydride-aluminum tertiarybutoxide complex according to the manipulative procedure described above in Example 70.

EXAMPLE 71

17-oxoandrostano[3,2-e]-1′,4′-thioxan-3′-one [X; R and R″ are H, X is O, X′ is H$_2$, Y and Y′ are CH$_3$, R′ and Z together represent O] and 2α-carbomethoxymethylmercaptoandrostan-3β-ol-17-one from 2α-carbomethoxymethylmercaptoandrostane-3,17-dione (Example 46).

EXAMPLE 72

17β - hydroxy - 17α - methylandrostano - [3,2 - e]-1′,4′-thioxan-3′-one [X; R is H, R′ is CH$_3$, R″ is H, X is O, X′ is H$_2$, Y and Y′ are CH$_3$, Z is OH] and 2α-carbomethoxymethylmercapto - 17α - methylandrostane - 3β,-17β-diol from 2α-carbomethoxymethylmercapto-17α-methylandrostan-17β-ol-3-one (Example 47).

EXAMPLE 73

20-oxoallopregnano[3,2-e]-1′,4′-thioxan-3′-one [X; R is H, R′ is COCH$_3$, R″ is H, X is O, X′ is H$_2$, Y and Y′ are CH$_3$, Z is H] and 2α-carbomethoxymethylmercaptoallopregnan-3β-ol-20-one from 2α-carbomethoxymethylmercaptoallopregnane-3,20-dione (Example 48).

EXAMPLE 74

17β - hydroxy - 17α - methyl - 19 - norandostano[3,2-e]-1′,4′-thioxan-3′-one [X; R is H, R′ is CH$_3$, R″ is H, X is O, X′ is H$_2$, Y is H, Y′ is CH$_3$, Z is OH] and 2α-carbomethoxymethylmercapto - 17α - methyl - 19 - norandrostane-3β,17β-diol from 2α-carbomethoxymethylmercapto-17α-methyl-19-norandrostan-17β-ol-3-one (Example 49).

EXAMPLE 75

4,4,17α - trimethyl - 17β - hydroxyandrostano[3,2 - e]-1′,4′-thioxan-3′-one and 2α-carbomethoxymethylmercapto-4,4-17α-trimethylandrostan-3β,17β-diol from 2α-carbomethoxymethylmercapto - 4,4,17α - trimethylandrostan-17β-ol-3-one (Example 50).

EXAMPLE 76

17β - hydroxy - 17α - propargylandrostano[3,2 - e]-1',4'-thioxan-3'-one [X; R is H, R' is CH$_2$C≡CH, R'' is H, X is O, X' is H$_2$, Y and Y' are CH$_3$, Z is OH] and 2α - carbomethoxymethylmercapto - 17α - propargylandrostane-3β,17β-diol from 2α-carbomethoxymethylmercapto-17α-propargylandrostan-17β-ol-3-one (Example 51).

EXAMPLE 77

6α,17α - dimethyl - 17β - hydroxyandrostano[3,2 - e]-1',4'-thioxan-3'-one [X; R is H, R' and R'' are CH$_3$, X is O, X' is H$_2$, Y and Y' are CH$_3$, Z is OH] and 2α-carbomethoxymethylmercapto - 6α,17α - dimethylandrostane-3β,17β-diol from 2α-carbomethoxymethylmercapto-6α,17α-dimethylandrostan-17β-ol-3-one (Example 52).

EXAMPLE 78

11α,17α - dihydroxy - 20 - oxoallopregnano[3,2 - e]-1',4'-thioxan-3'-one [X; R is H, R' is COCH$_3$, R'' is H, X is O, X' is (H)(OH-α), Y and Y' are CH$_3$, Z is OH] and 2α - carbomethoxymethylmercaptoallopregnane - 3β,11α,17α-triol-20-one from 2α-carbomethoxymethylmercaptoallopregnane-11α,17α-diol-3,20-dione (Example 53).

EXAMPLE 79

11α,21 - dihydroxy - 20 - oxoallopregnano[3,2 - e] - 1',4'-thioxan-3'-one [X; R is H, R' is COCH$_2$OH, R'' is H, X is O, X' is (H)(OH-α), Y and Y' are CH$_3$, Z is H] and 2α - carbomethoxymethylmercaptoallopregnane - 3β,11α,21-triol-20-one from 2α-carbomethoxymethylmercaptoallopregnane-11α,21-diol-3,20-dione (Example 54).

EXAMPLE 80

17α,21 - dihydroxy - 11,20 - dioxoallopregnano[3,2 - e]-1',4'-thioxan-3'-one [X; R is H, R' is COCH$_2$OH, R'' is H, X and X' are O, Y and Y' are CH$_3$, Z is OH] and 2α - carbomethoxymethylmercaptoallopregnane - 3β,17α,21-triol-11,20-dione from 2α-carbomethoxymethylmercaptoallopregnane-17α,21-diol-3,11,20-trione (Example 55).

EXAMPLE 81

*17β-Acetoxyandrostano[3,2-e]-1',4'-Thiazan-3'-One*

[X; R, R' and R'' are H, X is NH, X' is H$_2$, Y and Y' are CH$_3$, Z is OH]

2α - carbomethoxymethylmercapto - 17β - acetoxyandrostan-3β-ol (Example 70b) is heated with concentrated ammonium hydroxide and the resulting amide, 2α-carboxamidomethylmercapto - 17β - acetoxyandrostan - 3β-ol is treated with an excess of p-toluenesulfonyl chloride in pyridine solution to give 2α-carboxamidomethylmercapto - 17β - acetoxy - 3β - (p - toluenesulfonyloxy)androstane. The latter compound upon heating is converted to 17β-acetoxyandrostano-[3,2-e]-1',4'-thiazan-3'-one.

If the ammonium hydroxide in the foregoing procedure is replaced by methylamine, there can be obtained 17β-acetoxyandrostano[3,2-e]-N-methyl-1',4'-thiazan - 3' - one [X; R, R' and R'' are H, X is N(CH$_3$), X' is H$_2$, Y and Y' are CH$_3$, Z is OCOCH$_3$].

The compounds of the following examples can be prepared from the appropriate 2-carbomethoxymethylmercapto-3β-hydroxysteroid according to the procedure described above in Example 81.

EXAMPLE 82

17-oxoandrostano[3,2-e]-1',4'-thiazan-3'-one [X; R and R'' are H, X is NH, X' is H$_2$, Y and Y' are CH$_3$, R' and Z together represent O] from 2α-carbomethoxymethylmercaptoandrostan-3β-ol-17-one (Example 71).

EXAMPLE 83

17β-hydroxy-17α-methylandrostano[3,2-e]-1',4'-thiazan-3'-one [X; R is H, R' is CH$_3$, R'' is H, X is NH, X' is H$_2$, Y and Y' are CH$_3$, Z is OH] from 2α-carbomethoxymethylmercapto - 17α - methylandrostane-3β,17β-diol (Example 72).

EXAMPLE 84

20-oxoallopregnano[3,2-e]-1',4'-thiazan-3'-one [X; R is H, R' is COCH$_3$, R'' is H, X is NH, X' is H$_2$, Y and Y' are CH$_3$, Z is H] from 2α-carbomethoxymethylmercaptoallopregnan-3β-ol-20-one (Example 73).

EXAMPLE 85

17β-hydroxy-17α-methyl-19-norandrostano[3,2-e]-1',4'-thiazan-3'-one [X; R is H, R' is CH$_3$, R'' is H, X is NH, X' is H$_2$, Y is H, Y' is CH$_3$, Z is OH] from 2α-carbomethoxymethylmercapto - 17α - methyl-19-norandrostane-3β,17β-diol (Example 74).

EXAMPLE 86

4,4,17α - trimethyl-17β-hydroxyandrostano[3,2-e]-1',4'-thiazan-3'-one from 2α-carbomethoxymethylmercapto-4,4,17α-trimethylandrostan-3β,17β-diol (Example 75).

EXAMPLE 87

17β - hydroxy-17α-propargylandrostano[3,2-e]-1',4'-thiazan-3'-one [X; R is H, R' is CH$_2$C≡CH, R'' is H, X is NH, X' is H$_2$, Y and Y' are CH$_3$, Z is OH] from 2α - carbomethoxymethylmercapto - 17α - propargylandrostane-3β,17β-diol (Example 76).

EXAMPLE 88

6α,17α - dimethyl - 17β-hydroxyandrostano[3,2-e]-1',4'-thiazan-3'-one [X; R is H, R' and R'' are CH$_3$, X is NH, X' is H$_2$, Y and Y' are CH$_3$, Z is OH] from 2α-carbomethoxymethylmercapto-6α,17α - dimethylandrostane - 3β,17β-diol (Example 77).

EXAMPLE 89

11α,17α-dihydroxy-20-oxoallopregnano[3,2-e]-1',4'-thiazan-3'-one [X; R is H, R' is COCH$_3$, R'' is H, X is NH, X' is (H)(OH-α), Y and Y' are CH$_3$, Z is OH] from 2α-carbomethoxymethylmercaptoallopregnane-3β,11α,17α-triol-20-one (Example 78).

EXAMPLE 90

11α,21 - dihydroxy - 20 - oxoallopregnano[3,2-e] - 1',4'-thiazan-3'-one [X; R is H, R' is COCH$_2$OH, R'' is H, X is NH, X' is (H)(OH-α), Y and Y' are CH$_3$, Z is H] from 2α-carbomethoxymethylmercaptoallopregnane-3β,11α,21-triol-20-one (Example 79).

EXAMPLE 91

17α,21-dihydroxy-11,20-dioxoallopregnano[3,2-e]-1',4'-thiazan-3'-one [X; R is H, R' is COCH$_2$OH, R'' is H, X is NH, X' is O, Y and Y' are CH$_3$, Z is OH] from 2α - carbomethoxymethylmercaptoallopregnane - 3β,17α,21-triol-11,20-dione (Example 80).

EXAMPLE 92

*17β-Acetoxyandrostano[3,2-e]-N-Methyl-1',4'-Thiaz-5'-En-3'-One*

[IX; R, R' and R'' are H, X is N(CH$_3$), X' is H$_2$, Y and Y' are CH$_3$, Z is OCOCH$_3$]

A mixture of 10.00 g. of 2α-bromo-17β-acetoxyandrostan-3-one, 4.50 g. of N-methylmercaptoacetamide, 5 ml. of collidine and 350 ml. of acetonitrile was refluxed for twenty-two hours. The reaction mixture was concentrated and the residue partitioned between water and ether. The ether layer was washed with 2 N hydrochloric acid, water and saturated sodium chloride solution, dried and concentrated. The residue was recrystallized from acetone-hexane to give 4.50 g. of 17β-acetoxy-2α-(N-methylcarbamylmethylmercapto)androstan-3-one, M.P. 164.2–165.4° C. (corr.) when recrystallized three times from methanol.

The mother liquors from the initial acetone-hexane recrystallization above were concentrated, and the residue was recrystallized from acetonitrile to give 17β-acetoxyandrostano[3,2-e]-N-methyl-1',4'-thiaz-5'-en-3'-one, M.P. 223.4–227.8° C. (corr.), [α]$_D^{25}$=—91.9° (1% in chloroform).

I claim:
1. A member of the group consisting of steroido[3,2-e]-1',4'-thiaz-5'-en-3'-ones; steroido[3,2-e]-1',4'-thiazan-3'-ones; steroido[3,2-e]-1',4'-thiox-5'-en-3'-ones; and steroido[3,2-e]-1',4'-thioxan-3'-ones, in which the steroid moiety is selected from the group consisting of the estrane, androstane and allopregnane series, has from seventeen to about twenty-three carbon atoms exclusive of ester radicals, has the 5α-configuration, and is saturated at the 1-, 4-, 5- and 10-positions.

2. A compound selected from the group consisting of (A) compounds having the formula selected from

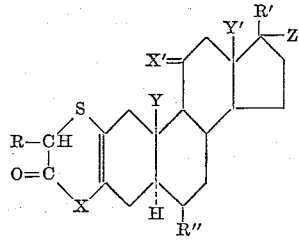

and

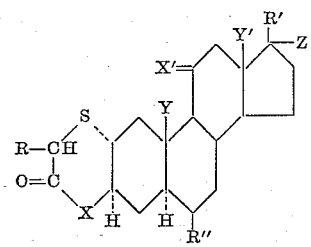

wherein R and R'' are members of the group consisting of hydrogen and lower-alkyl; R' is a member of the group consisting of hydrogen, lower-alkyl, lower-alkenyl, lower-alkynyl, acetyl, hydroxyacetyl, 1,2-dihydroxyethyl and 1-hydroxyethyl; X is a member of the group consisting of O, NH and N(lower-alkyl); X' is a member of the group consisting of H$_2$, (H)(OH) and O; Y and Y' are members of the group consisting of hydrogen and methyl; and Z is a member of the group consisting of hydrogen and hydroxy, Z being restricted to hydroxy when R' is a member of the group consisting of hydrogen, lower-alkyl, lower-alkenyl and lower-alkynyl; (B) the foregoing compounds wherein R' and Z together represent carbonyl oxygen; and (C) carboxylic acid esters of carbinols thereof, the acyl moieties of said esters having from one to about ten carbon atoms and having a molecular weight less than about 200.

3. 17β - hydroxy - 17α - lower-alkylandrostano[3,2-e]-1',4'-thiaz-5'-en-3'-one.
4. 17β-lower-alkanoyloxyandrostano[3,2-e]-1',4'- thiaz-5'-en-3'-one.
5. 17β - acetoxyandrostano[3,2-e] - 1',4'-thiaz-5'-en-3'-one.
6. 17β-hydroxyandrostano[3,2-e]-1',4'-thiaz-5' - en - 3'-one.
7. 17β - hydroxy - 17α - methylandrostano[3,2-e]-1',4'-thiaz-5'-en-3'-one.
8. 17β - (β-carboxypropionoxy)androstano[3,2-e]1',4'-thiaz-5'-en-3'-one.
9. The process for preparing a steroido[3,2-e]-1',4'-thiaz-5'-en-3'-one which comprises reacting a 2α-halo-3-oxosteroid with a member of the group consisting of mercaptoacetamide and N-lower-alkylmercaptoacetamides, in which the steroid moiety is selected from the group consisting of the estrane, androstane and allopregnane series, has from seventeen to about twenty-three carbon atoms exclusive of ester radicals, has the 5α-configuration, and is saturated at the 1-, 4-, 5- and 10-positions.

10. The process for preparing a compound selected from the group consisting of (A) compounds having the formula

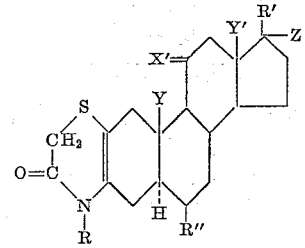

wherein R and R'' are members of the group consisting of hydrogen and lower-alkyl; R' is a member of the group consisting of hydrogen, lower-alkyl, lower-alkenyl, lower-alkynyl, acetyl, hydroxyacetyl, 1,2-dihydroxyethyl and 1-hydroxyethyl; X' is a member of the group consisting of H$_2$, (H)(OH) and O; Y and Y' are members of the group consisting of hydrogen and methyl; and Z is a member of the group consisting of hydrogen and hydroxy, Z being restricted to hydroxy when R' is a member of the group consisting of hydrogen, lower-alkyl, lower-alkenyl and lower-alkynyl; (B) the foregoing compounds wherein R' and Z together represent carbonyl oxygen; and (C) carboxylic acid esters of carbinols thereof, the acyl moieties of said esters having from one to about ten carbon atoms and having a molecular weight less than about 200, which comprises reacting a compound having the formula

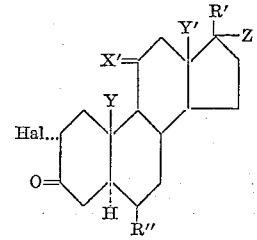

wherein R', R'', X', Y, Y' and Z are identical with their selection above and Hal is selected from the group consisting of chlorine, bromine and iodine, with a compound of the formula HSCH$_2$CONHR, wherein R is identical with its selection above.

11. 17β-hydroxy-17α - lower - alkylandrostano[3,2-e]-1',4'-thiazan-3'-one.
12. 17β - hydroxyandrostano[3,2-e] - 1',4'-thiazan-3'-one.
13. 17β-hydroxy - 17α - lower-alkylandrostano[3,2-e]-1',4'-thiox-5'-en-3'-one.
14. 17β - lower - alkanoyloxyandrostano[3,2-e]-1',4'-thiox-5'-en-3'-one.
15. 17β-hydroxy - 17α - lower-alkylandrostano[3,2-e]-1',4'-thioxan-2'-one.
16. 17β-lower - alkanoyloxyandrostano[3,2-e] - 1',4'-thioxan-2'-one.
17. A compound selected from the group consisting of (A) compounds having the formula

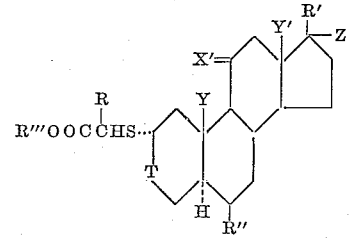

wherein T is a member of the group consisting of O=C and (β-HO)CH; R, R" and R''' are members of the group consisting of hydrogen and lower-alkyl; R' is a member of the group consisting of hydrogen, lower-alkyl, lower-alkenyl, lower-alkynyl, acetyl, hydroxyacetyl, 1,2-dihydroxyethyl and 1-hydroxyethyl; X' is a member of the group consisting of $H_2$, (H)(OH) and O; Y and Y' are members of the group consisting of hydrogen and methyl; and Z is a member of the group consisting of hydrogen and hydroxy, Z being restricted to hydroxy when R' is a member of the group consisting of hydrogen, lower-alkyl, lower-alkenyl and lower-alkynyl; (B) the foregoing compounds wherein R' and Z together represent carbonyl oxygen; and (C) carboxylic acid esters of carbinols thereof, the acyl moieties of said esters having from one to about ten carbon atoms and having a molecular weight less than about 200.

18. 17α-lower-alkyl-2α-carbo - lower - alkoxymethylmercaptoandrostan-17β-ol-3-one.

19. 17β-lower-alkanoyloxy - 2α - carbo - lower-alkoxymethylmercaptoandrostan-3-one.

20. 2α-carboxymethylmercaptoandrostan-17β-ol-3-one.

21. 3,17β - diacetoxy-2-carbomethoxymethylmercapto-2-androstene.

22. 17β-acetoxy - 2α - (N-methylcarbamylmethylmercapto)-androstan-3-one.

23. 17α-lower-alkyl-2α - carbo - lower - alkoxymethylmercaptoandrostane-3β,17β-diol.

24. 17β-lower-alkanoyloxy - 2α - carbo - lower-alkoxymethylmercaptoandrostan-3β-ol.

25. The process for preparing a steroido[3,2-e]-1',4'-thiox-5'-en-3'-one which comprises heating in the presence of a strong acid a member of the group consisting of 2α-carbo-lower-alkoxymethylmercapto - 3 - oxo-steroids and 2α-carboxymethylmercapto - 3 - oxo - steroids in which the steroid moiety is selected from the group consisting of the estrane, androstane and allopregnane series, has from seventeen to about twenty-three carbon atoms exclusive of ester radicals, has the 5α-configuration, and is saturated at the 1-, 4-, 5- and 10-positions.

26. The process for preparing a steroido[3,2-e]-1',4'-thiox-5'-en-3'-one which comprises heating in the presence of a strong acid a compound selected from the group consisting of (A) compounds having the formula

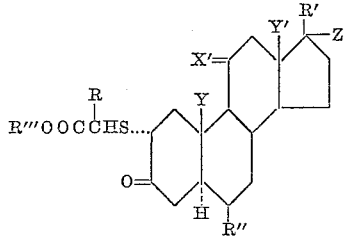

wherein R, R" and R''' are members of the group consisting of hydrogen and lower-alkyl; R' is a member of the group consisting of hydrogen, lower-alkyl, lower-alkenyl, lower-alkynyl, acetyl, hydroxyacetyl, 1,2-dihydroxyethyl and 1-hydroxyethyl; X' is a member of the group consisting of $H_2$, (H)(OH) and O; Y and Y' are members of the group consisting of hydrogen and methyl; and Z is a member of the group consisting of hydrogen and hydroxy, Z being restricted to hydroxy when R' is a member of the group consisting of hydrogen, lower-alkyl, lower-alkenyl and lower-alkynyl; (B) the foregoing compounds wherein R' and Z together represent carbonyl oxygen; and (C) carboxylic acid esters of carbinols thereof, the acyl moieties of said esters having from one to about ten carbon atoms and having a molecular weight less than about 200.

27. The process for preparing a steroido[3,2-e]-1',4'-thiaz-5'-en-3'-one which comprises heating with a member of the group consisting of ammonia and a lower-alkyl amine a compound selected from the group consisting of 2α - carbo - lower - alkoxymethylmercapto - 3 - oxo - steroids and 2α - carboxymethylmercapto-3-oxo-steroids, in which the steroid moiety is selected from the group consisting of the estrane, androstane and allopregnane series has from seventeen to about twenty-three carbon atoms exclusive of ester radicals, has the 5α-configuration, and is saturated at the 1-, 4-, 5- and 10-positions.

28. The process for preparing a steroido[3,2-e]-1',4'-thiaz-5'-en-3'-one which comprises heating with a member of the group consisting of ammonia and a lower-alkyl amine a compound having the formula

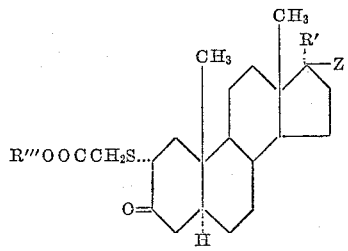

wherein R' and R''' are members of the group consisting of hydrogen and lower-alkyl; and Z is a member of the group consisting of hydroxy and lower-alkanoyloxy.

29. The process for preparing a steroido[3,2-e]-1',4'-thioxan-3'-one which comprises treating with an alkali metal hydride reducing agent a 2α-carbo-lower-alkoxymethylmercapto-3-oxo-steroid in which the steroid moiety is selected from the group consisting of the estrane, androstane and allopregnane series, has from seventeen to about twenty-three carbon atoms exclusive of ester radicals, has the 5α-configuration, and is saturated at the 1-, 4-, 5- and 10-positions.

30. The process for preparing a compound having the formula

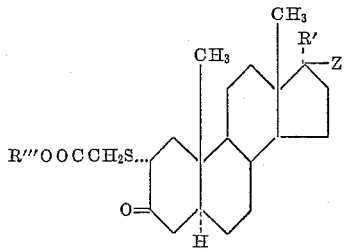

wherein R' and R''' are members of the group consisting of hydrogen and lower-alkyl; and Z is a member of the group consisting of hydroxy and lower-alkanoyloxy, which comprises reacting a compound having the formula

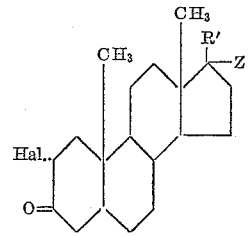

wherein R' and Z are identical with their selection above and Hal is selected from the group consisting of chlorine, bromine and iodine, with a compound having the formula R'''OOCCH$_2$SH, wherein R''' is identical with its selection above.

No references cited.

UNITED STATES PATENT OFFICE
CERTIFICATE OF CORRECTION

Patent No. 3,135,741                                                  June 2, 1964

Robert L. Clarke

It is hereby certified that error appears in the above numbered patent requiring correction and that the said Letters Patent should read as corrected below.

Column 1, line 11, for "-5-" read -- -5'- --; lines 15 to 25, for the extreme lower left portion of the formula reading:

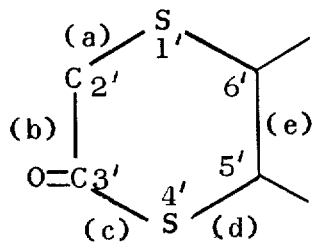     read     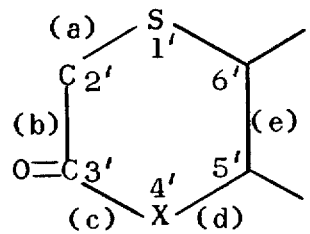

same column 1, line 39, for "any any" read -- and any --; lines 50 and 51, for "hydroxy-acyloxy," read -- hydroxy, acyloxy, --; column 2, lines 65 to 71, formula VIII, for the left-hand portion of the formula reading:

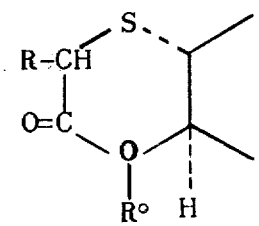     read     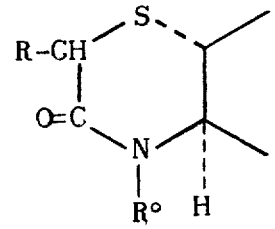

column 13, lines 71 and 72, for "acetone-ethyl acetone-hexane" read -- acetone-ethyl acetate-hexane --.

Signed and sealed this 23rd day of February 1965.

(SEAL)
Attest:

ERNEST W. SWIDER                                   EDWARD J. BRENNER
Attesting Officer                                  Commissioner of Patents